United States Patent [19]

Watkins

[11] Patent Number: 5,253,946
[45] Date of Patent: Oct. 19, 1993

[54] SUCKER ROD END FITTING

[75] Inventor: Damon L. Watkins, Levelland, Tex.

[73] Assignee: Dover Resources, Inc., Tulsa, Okla.

[21] Appl. No.: 886,525

[22] Filed: May 20, 1992

[51] Int. Cl.⁵ .................................................. F16B 11/00
[52] U.S. Cl. ....................................... 403/268; 403/265
[58] Field of Search .............. 403/268, 265, 269, 332, 403/334, 369, 404, 409.1, 179

[56] References Cited

U.S. PATENT DOCUMENTS

| | | | |
|---|---|---|---|
| Re. 32,865 | 2/1989 | Rutledge, Jr. et al. | 403/268 |
| 2,246,568 | 6/1941 | Berliner | 403/334 |
| 3,540,763 | 11/1970 | Yee | 403/265 |
| 3,698,749 | 10/1972 | Yonkers | 403/334 |
| 4,360,288 | 11/1982 | Rutledge, Jr. et al. | 403/268 |
| 4,401,396 | 8/1983 | McKay | 403/13 |
| 4,430,018 | 2/1984 | Fischer | 403/268 |
| 4,433,933 | 2/1984 | Parsons, Jr. et al. | 403/268 |
| 4,475,839 | 10/1984 | Strandberg | 403/2 |
| 4,585,368 | 4/1986 | Pagan | 403/266 |
| 4,662,774 | 5/1987 | Morrow | 403/265 |
| 4,683,953 | 3/1987 | Anderson et al. | 403/268 |
| 4,691,791 | 9/1987 | Fillet | 403/369 |
| 4,787,771 | 11/1988 | Allen | 403/370 |
| 4,822,201 | 4/1989 | Iwasaki et al. | 403/268 |
| 4,919,560 | 4/1990 | Rutledge, Jr. et al. | 403/268 |
| 4,958,961 | 9/1990 | Herbet et al. | 405/260 |

Primary Examiner—Randolph A. Reese
Assistant Examiner—Anthony Knight
Attorney, Agent, or Firm—Head & Johnson

[57] ABSTRACT

A connector to secure to the end of a cylindrical rod or cylindrical wire. The connector includes an elongated body having a receptacle with a cylindrical wall. A plurality of axially aligned tapered annuluses, coaxial with the receptacle, extend from the cylindrical wall into the body. Each annulus has a cross-section tangentially approaching the cylindrical wall at one end and an arcuate opposite end.

7 Claims, 2 Drawing Sheets

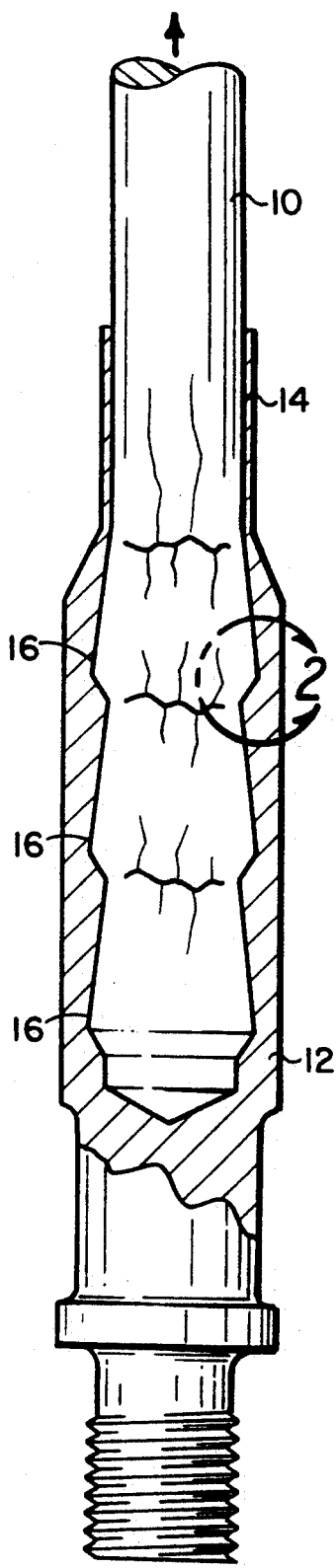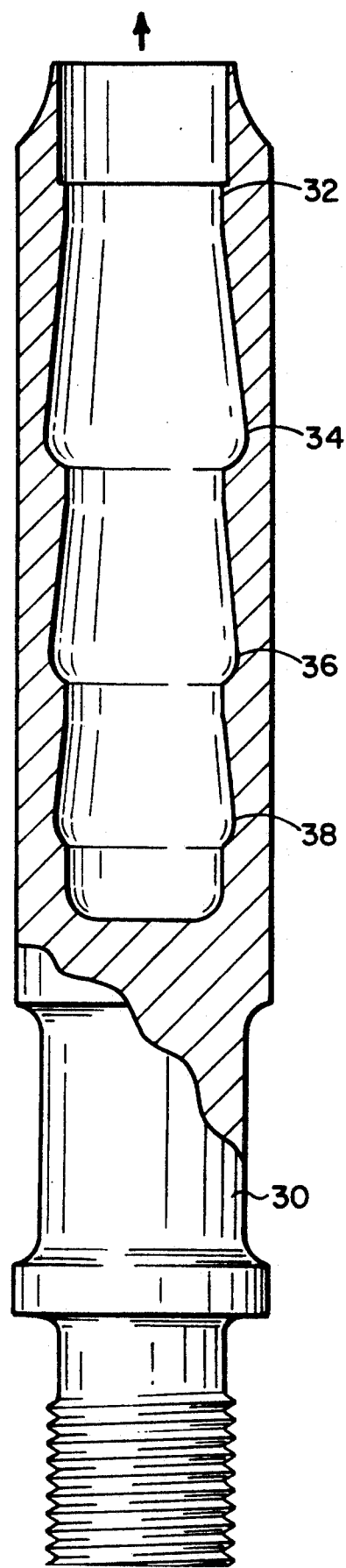
Fig.1
(PRIOR ART)
Fig.3

SUCKER ROD END FITTING

BACKGROUND OF THE INVENTION

1. Field of the Invention

The present invention relates to a connector device to connect the end of a cylindrical rod or a cylindrical wire. In particular, the present invention relates to a connector to connect the end of the cylindrical rod or wire so that the rods or wires are connected therein in end-to-end relationship.

2. Prior Art

The use of cylindrical or sucker rods is well known in underground wells to actuate a pump located in an underground well bore of a well. A series of sucker rods connected together in end-to-end relationship forms a string which extends down into the well hole. The string is connected to a pump at one end and to a reciprocating mechanism at the surface or well head in order to actuate the pump.

While at one time steel sucker rods were common, synthetic materials, such as fiberglass or other synthetic resins are being increasingly used. Fiberglass rods are advantageous because they are lighter than metal, withstand corrosive effects better than metal and have greater elasticity than metal.

The individual rods are connected together by metal connectors which are generally elongated members having an axial receptacle. The connector will typically have an opposite threaded end so that a pair of connectors may be secured together. The sucker rod may be connected to the connector through use of an adhesive which will bond to the rod.

Various designs have been suggested to produce a good bond and attachment between the rod and the end fitting.

Prior designs include Anderson et al. (U.S. Pat. No. 4,653,953), Parsons et al. (U.S. Pat. No. 4,433,933) and McKay (U.S. Pat. No. 4,401,396). A series of wedge or partial cone-shaped recesses extend from the receptacle into the body of the connector.

In order to make the attachment, an initially flowable adhesive is placed in the receptacle of the connector. A rod is then inserted into the receptacle, the adhesive fills the void space in the wedges or partial cone-shaped cuts. The adhesive will cure becoming a solid and will adhere to the rod. The solid adhesive is bonded to the rod and not to the inside of the metal connector.

When the assembled rod is pulled in tension in its threaded ends, the solid adhesive wedges bonded to the rod press against and force against the annular wedges. Slippage which occurs between the rod body and the end fitting causes the larger end of the adhesive wedge to separate from the surface of the metal leaving a slight gap.

A compressive force is imparted to the rod itself as the metal connector and the adhesive wedge press against each other to resist any further slippage. This force of compression is applied across the entire interval where the adhesive wedge and the metal surface contact. No compression force is applied in the segment adjacent the gap.

The abrupt change at the end of the gap from no compression to full, heavy compression results in a concentration of shear stress at that point, leading to the possibility of failure in the rod.

Accordingly, there exists a need to design a wedge or annulus that will spread out the force of compression along the annulus and eliminate the concentration of shear stress at a particular point in the annulus.

It is, therefore, a principal object and purpose of the present invention to provide an end fitting for a cylindrical rod or cylindrical wire that will spread out the force of compression along the adhesive and rod within the receptacle of the end fitting.

SUMMARY OF THE INVENTION

The present invention provides an improved end connector to attach to the end of a cylindrical rod or cylindrical wire to act as an end fitting. The connector may be connected to another connector so that the rods or wires may be connected in end-to-end relationship.

The connector incudes an elongated body having a cylindrical receptacle. A series of tapered annuluses are axially aligned with each other and are coaxial with the cylindrical receptacle. The shape of each annulus is radial rather than straight.

Each annulus has a cross-section having a pair of opposed ends. One end tangentially approaches the cylindrical wall. The opposite end is arcuate about a center point along an imaginary line which is perpendicular to the cylindrical wall of the receptacle.

The design of the annulus results in a more gradual change in the amount of compressive force between the rod and end fitting from no compressive force to full compression.

BRIEF DESCRIPTION OF THE DRAWINGS

FIG. 1 discloses a connector or end fitting for a cylindrical rod or cylindrical wire which is partially cut away;

FIG. 3 illustrates an end fitting constructed in accordance with the present invention;

DETAILED DESCRIPTION OF THE PREFERRED EMBODIMENT

Figure 4:
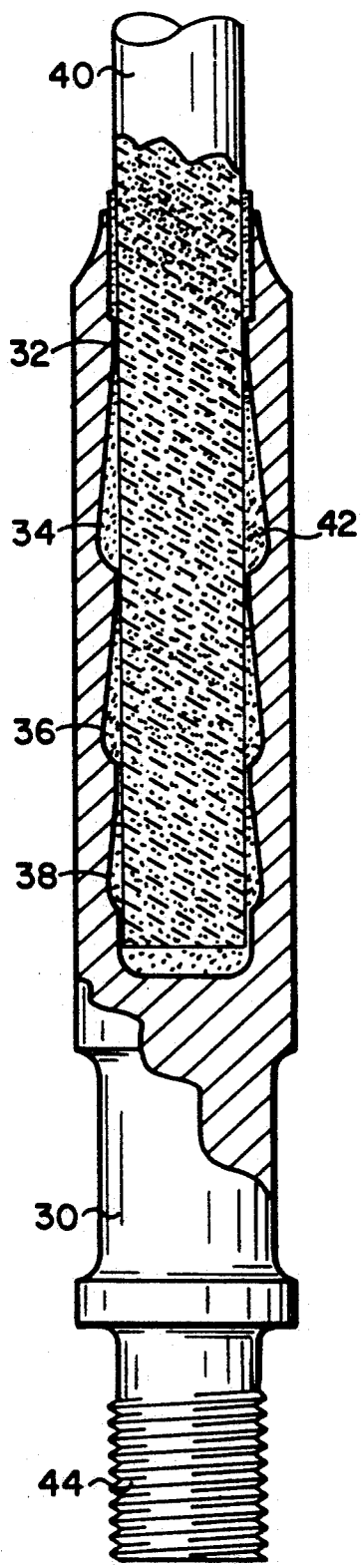
FIG. 4 illustrates a connector as shown in FIG. 3 with the cylindrical rod inserted and adhesive affixed to the rod.

Referring to the drawings in detail, FIG. 1 illustrates a partial cross-section of a cylindrical rod 10 which may be composed of a fiber reinforced synthetic resin such as fiberglass or other lightweight material. The fiberglass rods 10 are connected in end-to-end relationship to form a string through use of connectors such as connector 12. The connector 12 typically contains an elongated body having a cylindrical receptacle 14. The receptacle includes a series of wedge-shaped annuluses 16 which are coaxial with the axis of the cylindrical receptacle. The annuluses 16 extend into the body and are wedge-shaped in cross-section.

In order to secure the cylindrical rod 10 to the connector 12, a quantity of adhesive, which is initially in a flowable state, is placed in the receptacle 14. The rod is then inserted into the receptacle. The adhesive will fill each of the wedge-shaped annuluses. The adhesive will cure to a solid and adhere to the rod.

Figure 2:
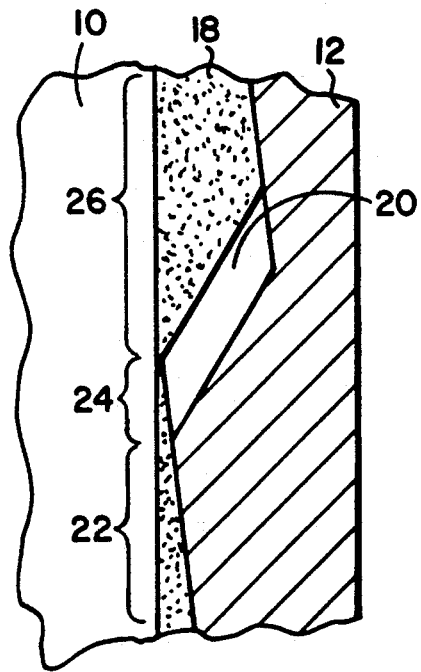
FIG. 2 illustrates an enlarged view taken along the circular section line 2—2 of FIG. 1.

FIG. 2 illustrates an enlarged view taken along section line 2—2 of FIG. 1 of a portion of the connector 12 where the adhesive 18 abuts the body of the connector 12.

The profile or cross-section of the wedge or partial cone-shaped annulus is a straight line which is shown in the X-Y plane. When the adhesive 18 cures or hardens to a solid, it is securely fastened to the cylindrical rod 10. While it fills the entire annulus, it is otherwise not fastened to the body of the connector 12.

When the assembled rod 10 and adhesive 18 have cured, one connector will be threadably fastened to an adjoining connector (not shown) so that the rods will be in end-to-end longitudinal relationship.

When the assembly string is pulled in tension by the threaded ends, the adhesive solid wedges 18 that are bonded to the rod press against the surface of the wedge-shaped annuluses 16. This action prevents and resists pulling the cylindrical rod 10 away from the connector 12. In practice, a small amount of slippage occurs between the cylindrical rod 10 and the end fitting. This causes the widest portion of the adhesive wedge to separate from the mating surface of the connector receptacle 14 thereby leaving a gap 20 which can be easily seen in the enlarged view in FIG. 2.

A compressive force is imparted to the cylindrical rod 10 as the adhesive solid wedge 18 and the surface of the annulus 16 of the connector 12 press against each other to resist slippage. This compression force is applied across the interval for which the adhesive wedge 18 and the receptacle 14 make contact. This interval is shown by brackets 22 and 26. Conversely, the compression force is not applied in the area indicated by the bracket 24.

The abrupt change along the adhesive wedge and, in turn, the rod from no compressive force to heavy compressive force results in a concentration of shear stress at that point, i.e., at each end of bracket 24. It is at this point where most failures would initiate in cylindrical rods with existing designs, as seen most clearly in FIG. 1.

FIGS. 1 and 2 and the foregoing discussion illustrate the prior art and do not constitute a part of the invention.

FIG. 3 illustrates the design of the present invention. The connector or end fitting 30 is shown partially cut-away to show the substantially cylindrical receptacle 32 and the tapered annuluses 34, 36 and 38. While three annuluses are shown in FIG. 3, it will be understood that a greater or lesser number might be employed. The end connector is constructed from a sturdy metal material.

The end connector 30 is shown in FIG. 3 prior to introduction of a cylindrical rod 40 into the cylindrical receptacle. The diameter of the cylindrical receptacle 32 is slightly larger than the diameter of the cylindrical rod.

The annuluses 34, 36 and 38 are axially aligned and are coaxial with the cylindrical receptacle 32.

The present invention reduces the concentration of shear stress at the edge of the gap by changing the shape of the annulus in the receptacle 32. The shape of each annulus is radial rather than straight. The curved profile or cross-section in the present invention results in a more gradual change at the edge of the gap from zero compressive force to full compressive force on the cylindrical rod thus, reducing the shear concentration that limits the strength and durability of cylindrical rods with the prior art design.

FIG. 4 illustrates the present invention connector or end fitting 30 showing a cylindrical rod 40 installed in the cylindrical receptacle 32. Prior to insertion of the cylindrical rod 40, a quantity of initially flowable adhesive 42 would be inserted into the receptacle. Once the cylindrical rod is inserted, the flowable adhesive would move and completely fill each of the annuluses 34, 36 and 38. An adhesive would be chosen that would securely bond to the rod. The adhesive may be cured in any number of ways including heating the end connector 30 to assist in curing. Upon curing, the adhesive 42 will become a solid that is securely bonded to the cylindrical rod 40.

The connector 30 has a threaded end 44 which will connect with the threaded end of another connector (not shown) to form a string of rods in end-to-end relationship.

Figure 5:
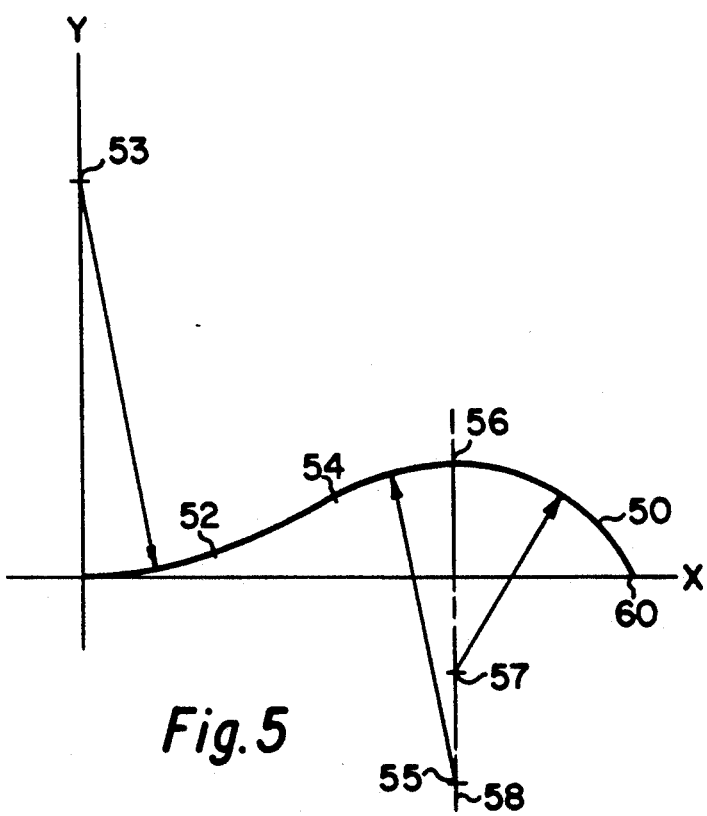
FIG. 5 illustrates a line showing the design of the connector shown in FIG. 3.

FIG. 5 illustrates a representation of the cross-section of the annulus showing the shape or design of the annulus through a line 50. The X-coordinate would represent an imaginary straight line extending longitudinally along the interior wall of the cylindrical receptacle 32. The X-coordinate would, thus, extend axially along the radius of the cylindrical receptacle 32. The Y-coordinate would represent an imaginary straight line perpendicular to and intersecting the axis of the cylindrical receptacle.

The line 50 has a pair of opposed ends with an intermediate portion extending into the body of the connection. If the line 50 is divided into segments, the segment between the X-Y coordinate origin (or zero point) and point 52 would tangentially approach the X-axis in a convex curve as viewed from within the receptacle. The center point 53 of this radial segment between the X-Y coordinate origin and point 52 would be along the Y-axis. Accordingly, the segment would tangentially approach the wall of the cylindrical receptacle 32. The equation of the segment between the X-Y coordinate origin and point 52 would be:

$$Y = R_{53} - \sqrt{R_{53}^2 - X^2}$$

The next segment of the line 50 between point 52 and point 54 would either be a straight line or, as shown in FIG. 5, would be radially arcuate. If arcuate, the center point of the radius would be along an imaginary line which is perpendicular to the X-axis, and at a position such that the X-coordinate is negative and the Y-coordinate is positive.

The segment of the line 50 between point 54 and point 56 is radially arcuate. The center point of the radius would be along an imaginary line 58 perpendicular to the X-axis. The equation of the segment between points 54 and 56 would be:

$$Y = Y_{55} + \sqrt{R_{55}^2 - (X - X_{55})^2}$$

$Y_{55}$ is the displacement of point 55 from the X axis that is fixed for each annulus.

Finally, the segment of line 50 between point 56 and point 60 is radially arcuate about a center point 57 lies along an imaginary line 58 providing a concave curve as viewed from within the receptacle. The equation of the segment between points 56 and 60 would be:

$$Y = Y_{57} + \sqrt{R_{57}^2 - (X - X_{57})^2}$$

$Y_{57}$ is the displacement of point 57 from the X axis that is fixed for each annulus.

Figure 7:
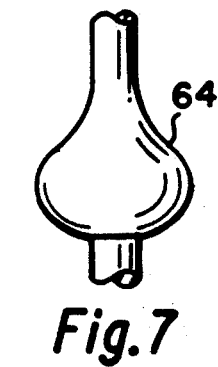
FIG. 7 illustrates an outline of an annulus for a connector of the present invention.
Figure 6:
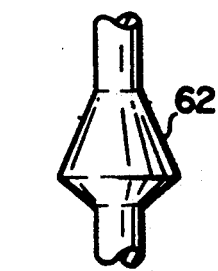
FIG. 6 illustrates an outline of a wedge-shaped annulus in the prior art.

FIG. 6 illustrates the prior art connector in FIGS. 1 and 2 wherein the cross-section shape 62 of the annulus is wedge-shaped. This is to be contrasted with the design of shape 64 shown in FIG. 7 which is arcuate.

It has been found that the design of the present invention results in a more gradual change in the amount of compressive force from no compression to full compression. This reduces the shear stress impressed on the rod that often causes the rod to fail.

Returning to a consideration of FIGS. 3 and 4, it will be observed that the major diameter of the annuluses 34, 36, 38 progressively decreases from the open end of the receptacle toward the closed end. This arrangement more evenly distributes tensile stress across the critical stress points of end connector 30. The three critical stress points on end connector 30 occur at the major diameter of the annuluses 34, 36 and 38. Tensile load on end connector 30 generally increases from the open end of the receptacle toward the closed end. Progressively reducing the major diameters of annuluses 34, 36 and 38 from the open end of the receptacle toward the closed end allows tensile stress at the three critical stress points of end connector 30 to be balanced or equalized.

It will also be observed from FIGS. 3 and 4 that the length of annuluses 34, 36 and 38 progressively decreases from the open end of the receptacle toward the closed end. Once the criteria are specified for line 50 of FIG. 5, the length and major diameter for each of annuluses 34, 36 and 38 are related to each other in fixed relationship. Thus, this invention requiring progressive reduction of major diameters of annuluses 34, 36 and 38 from the open end toward the closed end of the receptacle, inherently also requires progressive reduction of the length of annuluses 34, 36 and 38 from the open end toward the closed end of the receptacle.

Whereas, the present invention has been described in relation to the drawings attached hereto, it should be understood that other and further modifications, apart from those shown or suggested herein, may be made within the spirit and scope of this invention.

What is claimed is:

1. A connector to connect the end of a cylindrical rod, which connector comprises:
    an elongated body having a receptacle opening therein, the opening providing a receptacle wall; and
    said receptacle wall being defined by a plurality of axially aligned tapered annuluses, each annulus having a cross-section defined by a pair of opposed ends, one end asymptotically approaching said receptacle wall in a convex curve as viewed from within said receptacle and the opposite end arcuately approaching said receptacle wall in a concave curve as viewed from within said receptacle.

2. A connector as set forth in claim 1 wherein an initially flowable adhesive may be inserted in said receptacle prior to insertion of said cylindrical rod so that said adhesive will fill said annuluses and harden or cure to form a solid.

3. A connector as set forth in claim 1 wherein said cylindrical rods are fiberglass, and wherein each end of each said rod may be attached to a connector and wherein adjoining connectors may be attached together.

4. A connector as set forth in claim 1 wherein each of said tapered annuluses differ in length and wherein said annuluses are arranged so that the annuluses decrease in length from the opening of said receptacle.

5. A connector to connect the end of a cylindrical rod or wire, which connector comprises:
    a tubular body having a cylindrical receptacle; and
    a plurality of axially aligned tapered annuluses extending into said body and coaxial with said receptacle, each annulus having a cross-section radially tapered to a tangent with said cylindrical receptacle at one end of said annulus and radially arcuate about a center point positioned within said tubular body, and along an imaginary line perpendicular to said axis at the other end of said annulus.

6. A connector as set forth in claim 5 wherein said cylindrical rods are fiberglass, each end of each rod may be attached to a connector and wherein adjoining connectors may be attached.

7. A connector as set forth in claim 5 wherein an initially flowable adhesive may be inserted in said receptacle prior to insertion of cylindrical rod so that said adhesive will fill said annuluses and cure or harden to a solid.

* * * * *